(12) United States Patent
Bernini

(10) Patent No.: US 9,173,343 B2
(45) Date of Patent: Nov. 3, 2015

(54) AUTONOMOUS LAWN MOWER USING PERIMETER CABLE WITH ELECTRICAL SIGNAL

(76) Inventor: Fabrizio Bernini, Bucine (IT)

( * ) Notice: Subject to any disclaimer, the term of this patent is extended or adjusted under 35 U.S.C. 154(b) by 549 days.

(21) Appl. No.: 13/482,215

(22) Filed: May 29, 2012

(65) Prior Publication Data

US 2013/0199144 A1 Aug. 8, 2013

(30) Foreign Application Priority Data

Feb. 7, 2012 (EP) .................................... 12154174

(51) Int. Cl.
| | | |
|---|---|---|
| *A01D 34/00* | (2006.01) | |
| *G05D 1/02* | (2006.01) | |
| *B60L 1/00* | (2006.01) | |
| *B60L 11/18* | (2006.01) | |

(52) U.S. Cl.
CPC ............... *A01D 34/008* (2013.01); *B60L 1/003* (2013.01); *B60L 11/1805* (2013.01); *B60L 11/1816* (2013.01); *B60L 11/1824* (2013.01); *B60L 11/1827* (2013.01); *B60L 11/1864* (2013.01); *G05D 1/0225* (2013.01); *G05D 1/0265* (2013.01); *B60L 2200/40* (2013.01); *B60L 2260/32* (2013.01); *G05D 2201/0208* (2013.01)

(58) Field of Classification Search
USPC ..... 701/50; 56/10.2 R, 10.2 A, 10.2 D, 10.2 F
See application file for complete search history.

(56) References Cited

U.S. PATENT DOCUMENTS

| | | | | |
|---|---|---|---|---|
| 5,444,965 | A * | 8/1995 | Colens ........................ | 56/10.2 A |
| 6,255,793 | B1 * | 7/2001 | Peless et al. .................. | 318/580 |
| 6,465,982 | B1 * | 10/2002 | Bergvall et al. ............... | 318/587 |
| 6,615,108 | B1 * | 9/2003 | Peless et al. .................. | 700/245 |
| 7,133,746 | B2 * | 11/2006 | Abramson et al. ............. | 700/259 |
| 7,613,543 | B2 * | 11/2009 | Petersson et al. ............. | 700/245 |
| 7,729,801 | B2 * | 6/2010 | Abramson ..................... | 700/245 |
| 8,352,113 | B2 * | 1/2013 | Johnson et al. ................. | 701/26 |

FOREIGN PATENT DOCUMENTS

| | | |
|---|---|---|
| EP | 2413215 A2 | 2/2011 |
| WO | 2011/129728 A1 | 10/2011 |

\* cited by examiner

*Primary Examiner* — Alicia Torres
(74) *Attorney, Agent, or Firm* — Lucas & Mercanti, LLP

(57) ABSTRACT

An apparatus for cutting grass comprising: a lawn mower equipped with wheels and one or more blades for cutting grass; a perimeter cable delimiting a cutting area; a management device for generating an electrical signal (ES) in the cable; a recharging base. The lawn mower further comprises a control unit equipped with: sensor to detect the electrical signal (ES); a memory to store a maximum value (Vmax) and a minimum value (Vmin); a calculation module to determine, for intensity of detection, a target value (Tv) that is non-null and comprised between the maximum (Vmax) and minimum value (Vmin), the target value (Tv) being different from a preceding target value; an operative module to command the wheels so as to move the lawn mower in such a manner that the sensor detects the electrical signal (ES) at an intensity equal to the target value (Tv).

11 Claims, 4 Drawing Sheets

Fig.4
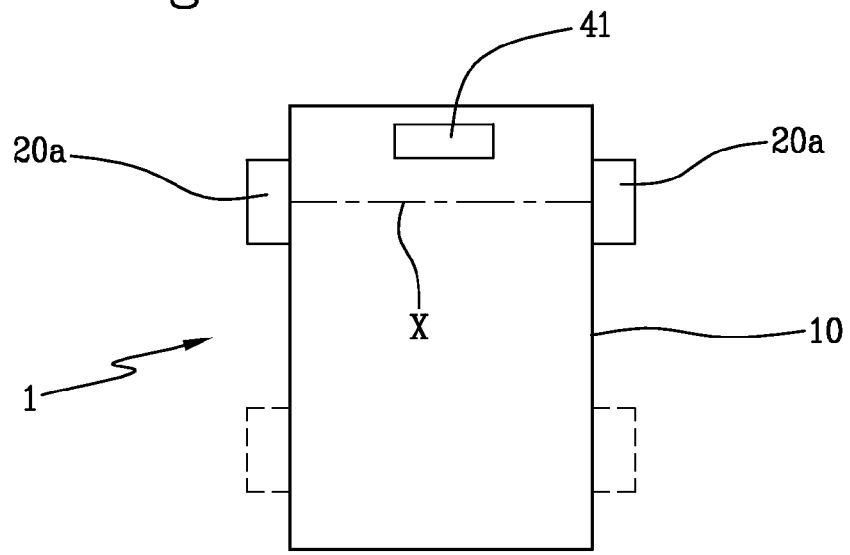
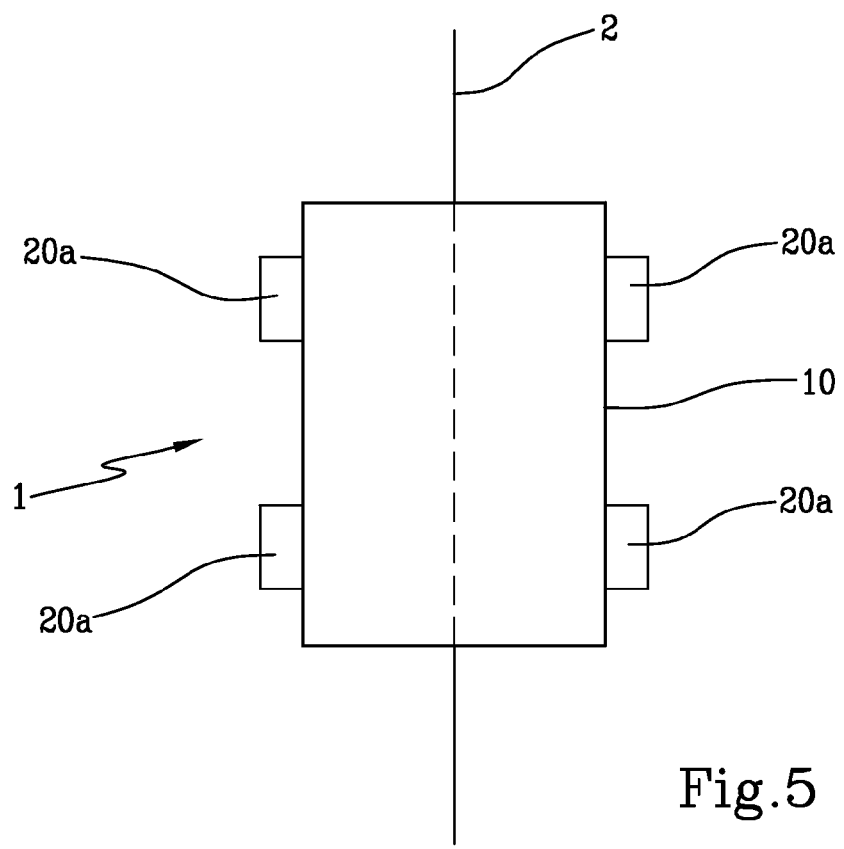
Fig.5

AUTONOMOUS LAWN MOWER USING PERIMETER CABLE WITH ELECTRICAL SIGNAL

CROSS-REFERENCE TO RELATED APPLICATION

This Application claims the benefit of priority from European Patent Application No. 12154174.2, filed Feb. 7, 2012, the contents of which are incorporated herein by reference.

FIELD OF THE INVENTION

The present invention concerns an apparatus for cutting grass.

BACKGROUND OF THE INVENTION

As is known, currently automatic lawn mowers are predisposed to operate within predetermined cutting areas.

Lawn mowers are utilized to keep lawns, gardens and grassy areas in general, in optimal condition, that is, to keep the grass below a certain height in a substantially homogeneous manner throughout the entire cutting area.

The cutting area is often delimited by a perimeter wire or cable, in which an electrical signal is propagated; the lawn mower, detecting this electrical signal, is capable of recognizing the boundaries of the cutting area and adjusting its own movement and/or cutting activities accordingly.

As is known, lawn mowers are equipped with an independent electrical power supply unit, which has the function of supplying electric power to the electrical and electromechanical devices present inside the lawn mower itself, such as, for example, the motors designed to drive the wheels and the blades, the electronic circuits dedicated to detection of the presence of grass, to detection of the presence of the perimeter cable, to the processing of the data collected and to controlling the various motors, etc.

When the power supply unit, which is typically made up of a battery or a battery pack, nears exhaustion, the lawn mower goes to a recharging base, where the power supply unit can be recharged so as to permit, after a certain amount of time, continuation of the activity of the lawn mower.

In the name of the same Applicant, the European patent application no. 11425071.5 has been filed describing a particular technique for re-entry to the recharging base, according to which the lawn mower follows a path consisting of a sequence of arcs having the ends thereof positioned, approximately, on the perimeter wire.

This solution undoubtedly offers a series of advantages, among which that of minimizing the probability of the lawn mower passing over the same area several times, damaging the grass that is situated there.

Yet, while continuing the research activity, the Applicant found that the arc paths also involve some drawbacks:

the route that the lawn mower follows to re-enter to the base is decidedly longer with respect to a theoretical rectilinear path, and therefore leads to waste in terms of time, and also in terms of the power consumed by the lawn mower;

in order to describe arc paths, the wheels of the lawn mower are activated in a substantially alternating manner (to turn right, the left wheel is activated, while the right wheel remains stationary, and vice versa), so that the lawn mower can never operate at maximum speed, which is clearly reached on rectilinear paths; this involves a further extension of the time required for re-entry to the recharging base; and the fact that arc paths are followed, involves a significant task on the part of the mechanical and electrical/electronic structure of the lawn mower and, in the long term, more frequent and expensive maintenance activity may be required.

BRIEF SUMMARY OF THE INVENTION

In light of the above, the aim of the present invention is to make available an apparatus for cutting grass, wherein, though minimizing the probability of the lawn mower passing more than once over the same area, that is, over the same tracks, the time required for re-entry of the lawn mower itself to the base is considerably reduced.

Another aim of the invention is to supply an apparatus for cutting grass, wherein the lawn mower can dedicate a greater share of the energy stored in the batteries thereof to the cutting of grass, by reducing the energy dedicated to movement for re-entry to the base.

Another aim of the invention is to make available an apparatus for cutting grass that reduces the complexity of the execution of the operation consisting of the re-entry to the base, thereby protecting the lawn mower from wear, breakdown and malfunctioning.

This and other aims are substantially achieved by an apparatus for cutting grass according to that which is described in the attached claims.

Further characteristics and advantages will become more apparent from the detailed description of a preferred, but not exclusive, embodiment of the invention.

This description is provided herein below, with reference to the attached figures, which are also provided by way of purely illustrative, and thus non-limiting, example, in which.

Figure 2:
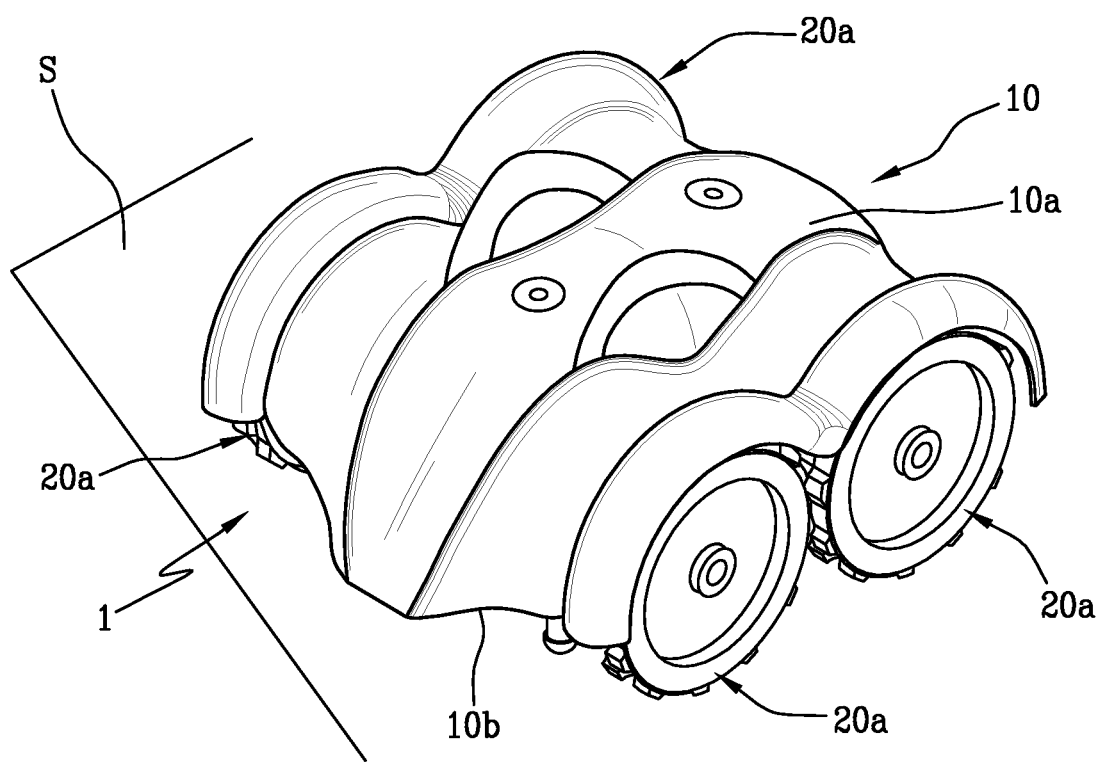
FIG. 2 shows a schematic perspective view of a lawn mower that is part of the apparatus according to the present invention.

FIG. 4 schematically shows details of the lawn mower appearing in FIG. 2; and

FIG. 5 schematically shows an operative condition of the lawn mower that is part of the apparatus according to the invention.

DETAILED DESCRIPTION OF THE INVENTION

With reference to the attached figures, "100" is used as an overall indication of an apparatus for cutting grass according to the invention.

The apparatus 100 (FIG. 1) comprises a lawn mower 1, predisposed to operate at least within a cutting area S delimited by a perimeter cable 2.

Figure 3:
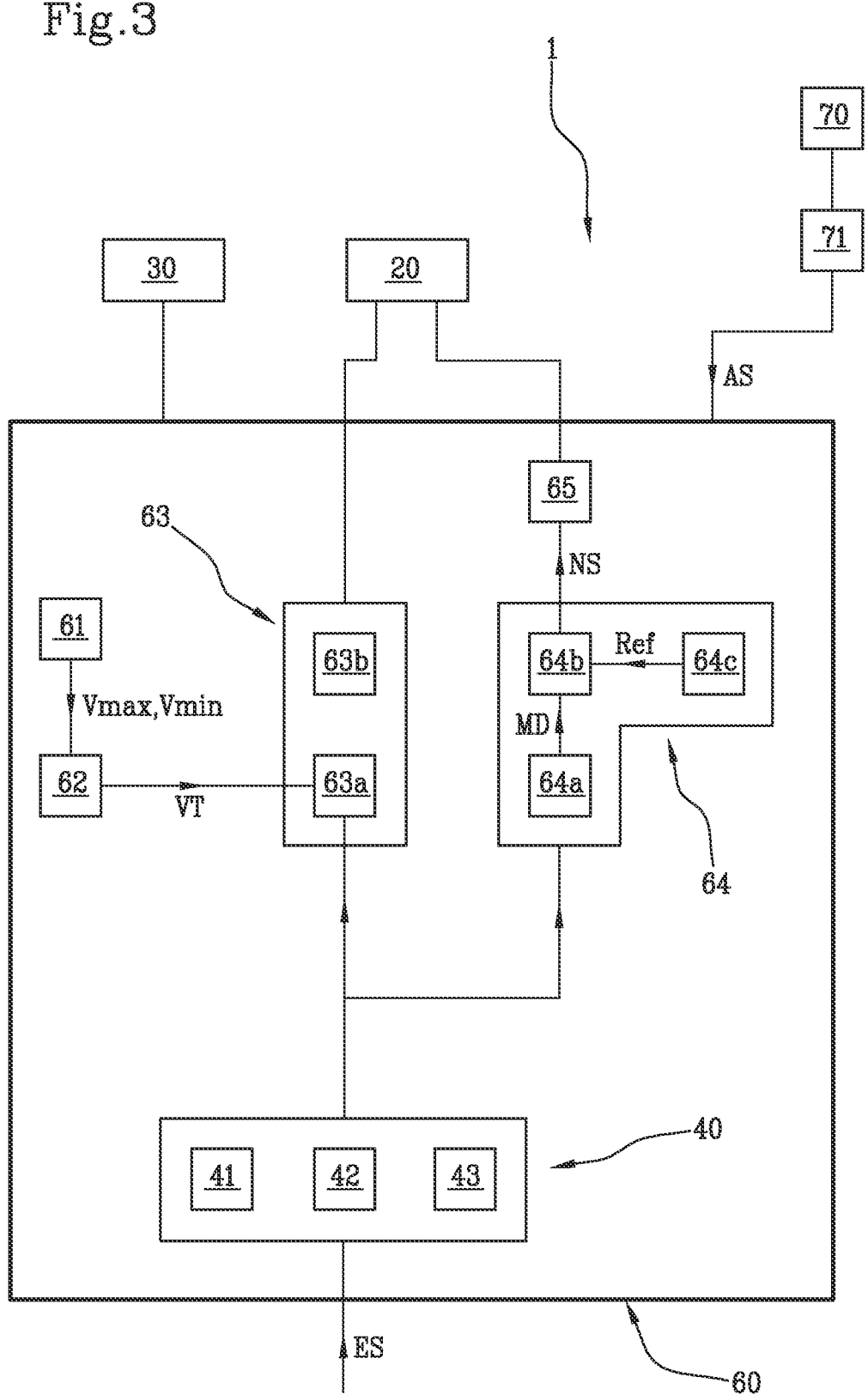
FIG. 3 is a block diagram of a lawn mower that is part of the apparatus according to the invention.

The lawn mower 1 (FIGS. 2-3) comprises above all a frame 10; the frame 10 can comprise, for example, an upper body 10a and a lower body 10b, preferably removably associated with one another.

The upper body 10a and the lower body 10b can be realized, for example, in plastic material.

The lawn mower 1 further comprises movement means 20 mounted on the frame 10 to move the lawn mower 1 with respect to the cutting area S; the latter may consist of a lawn, a garden, a flowerbed, or in general any surface on which the lawn mower 1 is required to operate.

The movement means 20 preferably comprises a plurality of wheels 20a, assembled on the frame 10, and one or more motors, predisposed for the rotating movement of said wheels 20a.

By way of example, the lawn mower 1 shown in the accompanying figures is provided with four wheels 20a, which are appropriately motorized.

The lawn mower 1 further comprises one or more blades 30 (schematically shown in FIG. 3), assembled on the frame 10, to cut the grass existing in the cutting area S.

Advantageously, the blades 30 are driven by suitable motors, which are housed inside the frame 10.

By way of example, the motors cited may be electric motors, powered by a battery; the battery may be of a rechargeable type. Preferably, the recharging takes place at a recharging base 80.

Preferably, the recharging base 80 is positioned along the perimeter cable 2.

The recharging base 80 per se is known in the prior art and thus will not be described in further detail.

In one embodiment, recharging is obtained through electrical coupling, particularly of an inductive type. Preferably, the battery cited can also supply power to a control unit (which will be described herein below), and other electrical/electronic devices provided on board the lawn mower 1.

The apparatus 100 further comprises a management device 3 (FIG. 1) associated with the perimeter cable 2 cited.

The management device 3 is configured so to supply an output electrical signal ES. The management device 3 is connected to the cable 2 in such a manner that the electrical signal ES is propagated in the cable 2 itself. Preferably, the perimeter cable 2 is an electrical cable.

The waveform of the electrical signal ES may be sinusoidal, square wave, etc.

Advantageously, the lawn mower 1 further comprises a control unit 60, the function of which is to manage at least partially the operation of the lawn mower itself.

In particular, the control unit 60 comprises sensor means to detect the electrical signal ES that is propagated in the cable 2.

In one embodiment, the sensor means 40 can comprise a detection element 41, preferably consisting of an inductive element, such as a coil for example.

Preferably, the sensor means 40 further comprises a current scanner 42 and, possibly, a current amplifier 43 for the purpose of permitting a better reading of the signal detected.

Preferably, the detection element 41 is assembled on the frame 10, in a position to the front of the frame. In particular, the detection element can be advantageously positioned frontward with respect to an axis X that ideally, or even mechanically, joins the front wheels of the lawn mower (FIG. 4).

By virtue of the detection performed by the sensor means 40, the control unit 60 manages the movement of the lawn mower 1.

More specifically, the control unit 60 further comprises a memory 61 so as to store a maximum value Vmax and a minimum value Vmin for an intensity of detection of said electrical signal ES.

These maximum and minimum values, Vmax and Vmin, relate to the intensity with which the sensor means 40 detects the electrical signal ES.

In practice, the maximum and minimum values, Vmax and Vmin, can be expressed in Volts.

Said maximum and minimum values, Vmax and Vmin, are respectively representative of a minimum distance Dmin and a maximum distance Dmax of the lawn mower 1 from the perimeter cable 2.

In fact, the closer the lawn mower 1 is with respect to the cable 2 (less distance), the greater the intensity will be with which the electrical signal ES is detected, and vice versa, the further away the lawn mower 1 is with respect to the cable 2 (greater distance), the lower the intensity will be with which the electrical signal ES is detected.

The maximum and minimum values, Vmax and Vmin, can be advantageously detected by the lawn mower 1, while in operation, by means of the sensor means 40. Alternatively, these values can be preset.

The control unit 60 further comprises a calculation module 62 associated with the memory 61 cited.

The calculation module 62 is configured to determine a target value Tv for the intensity of detection of the electrical signal ES. The target value Tv is non-null and is comprised between the maximum value Vmax and the minimum value Vmin. The target value Tv is representative of a target distance Td of the lawn mower 1 with respect to the perimeter cable 2.

In practice, the calculation module 62 determines the target value Tv so as to determine, correspondingly, the target distance Td at which the lawn mower 1 must position itself with respect to the cable 2.

Conveniently, the target value Tv is substantially different from a preceding target value determined for the intensity of detection of the same electrical signal ES. In practice, as will be clearer herein below, the target value Tv is employed to define the mode by which the lawn mower 1 carries out its re-entry to the recharging base 80. For the purpose of performing this re-entry substantially following the course of the cable 2, but without always passing over the same areas or tracks, the target value Tv is determined in such a manner as to take on a different value for each work cycle, that is, for each time the lawn mower 1 has to re-enter to the recharging base 80.

In one embodiment, the target value Tv is determined randomly, by means of an algorithm that is capable of generating random numbers comprised within the interval having as extreme values the cited maximum value Vmax and minimum value Vmin.

Preferably, the extreme values Vmax and/or Vmin can be excluded from the range of acceptable values.

More generally, within the interval having Vmax and Vmin as extreme values, a subinterval can be selected, within which the target value Tv is calculated.

In a different embodiment, the target value Tv is determined according to a predetermined sequence of values, for example cyclically.

The control unit 60 further comprises an operative module 63 configured to command the movement means 20 so as to move the lawn mower 1 in such a manner that the sensor means 40 detects the electrical signal ES at an intensity substantially equal to the target value Tv.

In other words, by combining the information coming from the sensor means 40 and from the calculation module 62, the operative module 63 sends appropriate command signals to the movement means 20 so that, during movement of the lawn mover 1, the intensity with which the sensor means 40 detects the electrical signal ES is substantially equal to the target value Tv.

In this manner, as it is re-entering to the recharging base 80, the lawn mower 1, is kept at a distance, with respect to the perimeter cable 2, that is substantially equal to the cited target distance Td.

Delving into greater detail, the operative module 63 preferably comprises a comparison module 63a configured to compare the target value Tv with the intensity with which the electrical signal ES is detected by the sensor means 40. In this manner, it is possible to verify whether the lawn mower 1 is moving at a proper distance (that is, at a distance that is substantially equal to the target distance Td).

Preferably, the operative module 63 also comprises a command module 63b associated with the comparison module 63a and configured to command appropriately the movement means 20 based on the comparison made by the comparison module 63a. In particular:

in the case where the intensity of detection is lower than the target value Tv, the command module 63b then commands the movement means 20 in such a manner that the lawn mower 1 turns in a certain direction, for example leftward.

in the case where the intensity of detection is greater than the target value Tv, the command module 63b then commands the movement means 20 in such a manner that the lawn mower 1 turns in a direction differing from said certain direction, for example rightward.

The corrections made to the path of the lawn mower 1 by the command module 63b are preferably minor, that is, they do not involve abrupt turns or turns that too sharp. This is because, for the purposes of a re-entry to the recharging base 80, following an extremely precise path is not indispensable, and it is necessary to give more importance to other factors (e.g. the possibility of moving the lawn mower 1 at a high speed and achieving rapid re-entry to the recharging base 80).

Preferably, the corrections introduced to the path of the lawn mower 1 by the command module 63b entail curvatures having a radius greater than 0.70 meter and in particular greater than or equal to 1 meter.

Preferably, the corrections introduced to the path of the lawn mower 1 by the command module 63b entail curvatures defining angles of less than 90°, and particularly angles of less than 70°.

Preferably, the comparison module 63a repeatedly carries out the comparison between the intensity with which the electrical signal ES is detected and the target value Tv. For example, this comparison can be carried out maintaining a given interval between each comparison and the next. Said given interval can be of a duration comprised within a range of 1 to 3 seconds. For example, this duration can be substantially equal to 2 seconds.

Preferably, the electrical signal is detected with greater frequency (that is, more often than once every 2 seconds), for example every 0.1 second. A mean of the detected values is then calculated, for example, an arithmetic mean, and the result is compared with the target value Tv.

Preferably, as mentioned above, the lawn mower 1 comprises a power supply unit 70. The power supply unit can comprise, for example, one or more batteries.

The function of the power supply unit 70 is to supply electrical power to the electrical-electronic-electromechanical devices present on board the lawn mower 1.

The power supply unit 70 can be recharged at the cited recharging base 80.

Advantageously, a monitoring circuit 71 is associated with the power supply unit 70.

The monitoring circuit 71 is configured to monitor the power supply unit 70, and particularly the charge level thereof. When this level drops below a preset threshold, the monitoring circuit provides for generating an alert signal AS.

The alert signal AS is sent to the control unit 60, so that the calculation module 62 and the operative module 63 can be activated as a function of the alert signal AS.

In practice, when the monitoring circuit 71 detects that the power supply unit 70 needs to be recharged, it signals this situation to the control unit 60, thus activating the calculation module 62, so as to determine the target value Tv, and the operative module 63, for consequent movement of the lawn mower 1, so that the lawn mower 1 itself can re-enter to the recharging base 80 in accordance with that which has been established by the calculation module 62.

In one embodiment, the perimeter cable 2 has a portion P having a particular conformation.

Figure 1:
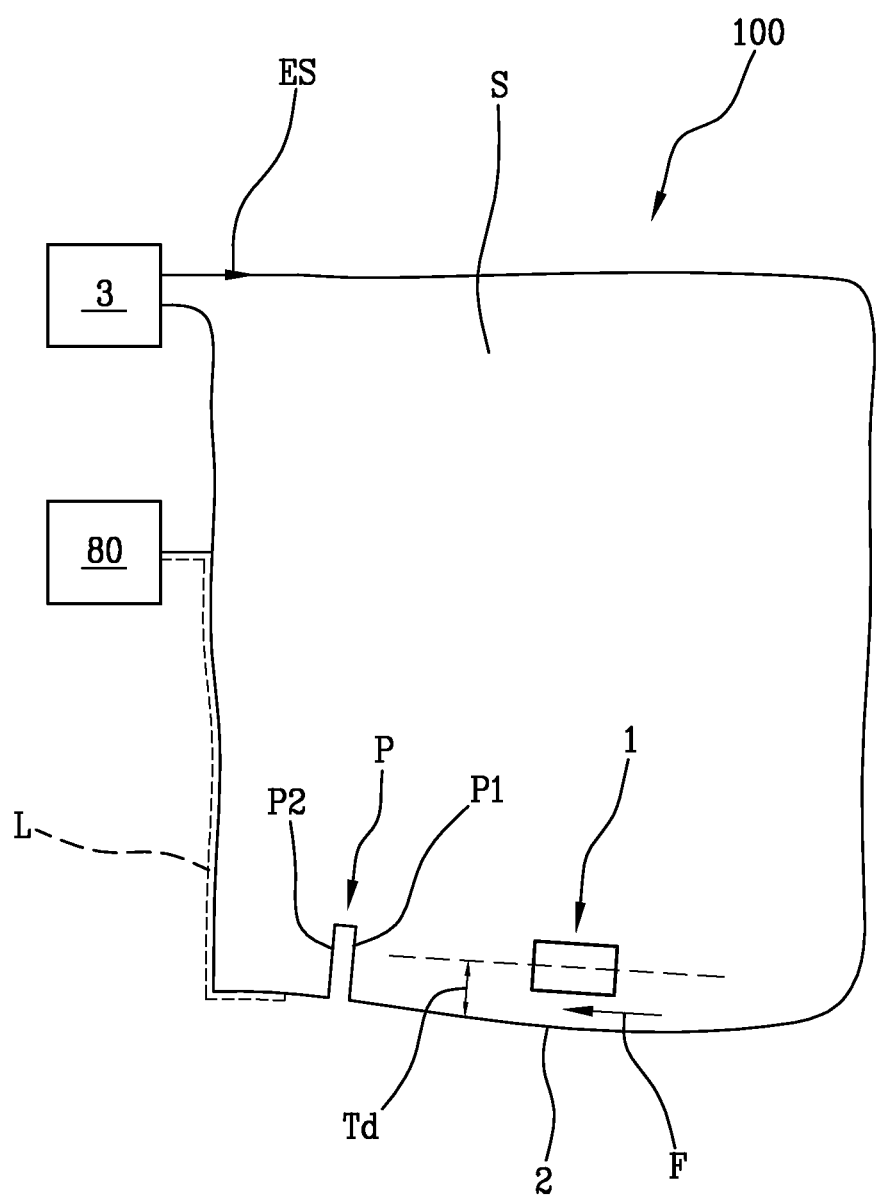
FIG. 1 is a block diagram of an apparatus according to the invention.

The portion P is schematically shown in FIG. 1 by way of example.

Preferably, the portion P has a conformation that is concave with respect to the perimeter defined by the perimeter cable 2.

In particular, the portion P has a substantially "U-shaped" conformation, so as to form a sort of indentation in the perimeter of the cutting area S facing the interior of the cutting area S itself.

In one embodiment, the portion P can have a substantially square-shaped conformation, similar to that defined by three sides of a rectangle (two longer sides and one shorter).

By way of example, the depth to which the portion P indents towards the interior of the cutting area S can be comprised between 1.5 m and 2.5 m.

By way of example, the thickness (that is, the size of the portion P defined in a direction perpendicular to the prevalent development of the portion P itself, or parallel to the part of the cable 2 immediately adjacent to the portion P) can be comprised between 3 cm and 10 cm.

In general, the ratio of depth to thickness of the portion P is preferably greater than 10, and even more preferably greater than 20, and particularly greater than 30.

In a preferred embodiment, the ratio of depth to thickness of the portion P can be equal or greater than 40.

As will become clearer below, the portion P is useful, as when it is detected by the lawn mower 1, it permits the latter to adjust its behaviour accordingly.

Advantageously, the control unit 60 further comprises a recognition unit 64 that is suitable for recognizing the cited portion P of the perimeter cable 2, and an auxiliary module 65 that is suitable for commanding the movement means 20 based on the recognition carried out by the recognition module 64.

In further detail, the recognition module 64 is configured to determine, based on the electrical signal ES being propagated in the portion P and detected by the sensor means 40, the main data MD that are representative of the conformation of this portion P of the cable 2.

In particular, the recognition module 64 may comprise a positioning circuit 64a connected to the sensor means 40 and configured to determine, during movement of the lawn mower 1, the position of the cited detection element 41 with respect to the cutting area S.

In practice, based on the detection of the electrical signal ES on the part of the detection element 41, the positioning circuit 64a is capable of determining whether the latter is inside or outside the cutting area S.

There are various techniques, known in the sector, that permit the performance of this operation. Merely by way of example, the one described in European patent application no. 05425466.9 in the name of this same Applicant can be considered among them. However, it should be kept in mind that within the scope of the present invention, different techniques can also be utilized.

In any case, as this typology of detection and processing is well known to experts in the sector, further details shall not be provided in this regard.

The main data MD cited can thus be determined based on a plurality of successive positions of the detection element 41 with respect to the perimeter cable 2 during movement of the lawn mower 1.

In practice, the main data MD may comprise first data, which are representative of the fact that the detection element 41 is located inside the cutting area S, and second data representative of the fact that the detection element 41 is located outside the cutting area S.

The conformation of portion P is such that it can be easily identified by means of a succession of data of the "inside/outside" type referring to the detection element 41.

In this regard, refer to the schematized situation shown in FIG. 1: the lawn mower 1 is moving, following, at a distance substantially equal to the target distance Td from the perimeter cable 2, in the direction indicated by the arrow F. When the detection element 41 nears the portion P, it detects closer proximity with respect to the perimeter cable 2. At this stage, the lawn mower 1 still does not know it is at the portion P. The lawn mower 1 thus behaves as it always does when it comes too close to the perimeter cable 2, that is, the command unit 60 commands the movement means 20 to turn in a first direction, for example to the right.

During the execution of this turn curving to the right, the detection element 41 initially comes to a location outside the cutting area S, that is, beyond the first tract P1 of the portion P. Immediately afterwards, the same detection element 41 passes into the second tract P2 of the portion P as well, and is thus inside the cutting area S once again. It should not be overlooked that in this situation the portion P is narrow and deep in conformation, and that therefore the inside/outside position of the detection element 41 changes quite quickly.

The positioning circuit 64*a* supplies, with substantial continuity (that is, with pre-established frequency), data that are representative of the position of the detection element 41; in this sense, the main data MD are to be considered as representative of the conformation of the portion P of the perimeter cable 2, and based on these data, it is thus possible to determine the presence of the portion P itself.

In further detail, the recognition module 64 also comprises a comparison circuit 64*b* configured to compare the main data MD with pre-stored reference data Ref; the reference data Ref, which are recorded in an appropriate memory register 64*c*, are representative of a reference conformation.

In practice, the reference data Ref are representative of the conformation of the portion P, which has been previously recorded in the lawn mower 1, so that the latter, and particularly the recognition module 64, can recognize it when it is detected by means of the sensor means 40.

By way of example, the reference data Ref may comprise, in order, data representative of the fact that the detection element 41 is located outside the cutting area S for a first route, and data representative of the fact that the detection element 41 is located inside the cutting area S for a second route successive to the first route.

In one embodiment, the detection carried out by the sensor means 40 can be discrete, and performed with a certain frequency (e.g. once every 0.1 second). Thus, within the reference data Ref, the data representative of the fact that the detection element 41 is inside the cutting area S may consist of a certain number of discrete detections in this sense (for example, twenty detections). Likewise, the data representative of the fact that the detection element 41 is then outside the cutting area S may consist of a certain number of detections in this sense (for example, five detections).

When the recognition module 64, and particularly the comparison circuit 64*b*, establish that there is a substantial correspondence between the main data MD and the reference data Ref, a notification signal NS is generated.

The notification signal NS is thus indicative of the fact that the lawn mower 1 is situated at the portion P of the perimeter cable 2.

The notification signal NS is directed to the cited auxiliary module 65 so that the latter can command the movement means 20 in such a manner that the lawn mower 1 follows the perimeter cable 2 at a substantially zero distance from the cable 2.

The operative module 63, which was operating in such a manner as to keep the lawn mower 1 at the target distance Td from the perimeter cable 2, interrupts this operating mode so that the auxiliary module 65 can instead arrange for the lawn mower 1 to move into a position substantially overlapping the perimeter cable 2 itself.

For this purpose, the auxiliary module 65 provides for commanding the movement means 20 in such a manner that the lawn mower 1 moves so as to encounter the cable 2 once again and then moves following the cable 2 itself.

Note that after it has detected the portion P, the lawn mower 1 is in the following situation: the detection element has passed into the first tract P1 and then the second tract P2. Therefore, the detection element 41 is located inside the cutting area S, after having left the portion P behind it.

As stated previously, the auxiliary module 65 provides for movement of the lawn mower 1 so that the latter encounters the cable 2 once again. For this purpose, the auxiliary module 65 preferably commands the movement means 20 in such a manner as to turn in a second direction differing from said first direction, so as to encounter the perimeter cable 2 once again. To return to the example situation described starting from the situation schematized in FIG. 1, the second direction will be leftward, and the lawn mower 1 will be turned left.

Following this operation, the lawn mower 1, and particularly the detection element 41, are necessarily located once again in proximity to the perimeter cable 2. At this point, the auxiliary module 65 commands the movement means 20 in such a manner that the lawn mower 1 follows the perimeter cable 2.

Preferably, this operation can be limited to a preset length, which, by way of example, can be of a length L comprised between 6 m and 12 m.

Note that in the present context and in the claims herein below, the expression "to follow the perimeter cable" preferably means "to move in a manner that is substantially parallel to, and preferably substantially straddling, said perimeter cable".

The expression "straddling" simply means that the lawn mower is positioned so as to have at least two wheels on one side, and at least two wheels on the opposite side, with respect to the same tract of the perimeter cable (situation schematically illustrated in FIG. 5).

As stated previously, the length L can develop along the cable 2 to guide the lawn mower towards the recharging base 80.

It is further provided that a portion P can be positioned before narrow or difficult passages, so that in following the respective length L along the perimeter cable 2, the lawn mower can overcome the obstacle in an optimal manner.

In light of the above, the operation of the apparatus 100 in accordance with the present invention, can be described as follows.

Under its normal operating conditions, the lawn mower 1, moves within the cutting area S, concomitantly activating the blades 30 thereof so as to cut the grass present in the cutting area S. This movement can take place according to a path dictated by a pre-established motion algorithm (random motion, spiral motion, etc.).

When the lawn mower 1 encounters the perimeter cable 2, during normal operation, it carries out the usual movements consisting of a short reverse and a turn, and then continues on.

As soon as the alert signal SA is generated, that is, when it is necessary to re-enter to the recharging base, the calculation module 62 and the operative module 63 are activated.

Note that in one embodiment, an activation signal similar to the alert signal SA can be generated even when the lawn mower 1 deems its work completed (this assessment can be made by means of techniques that are well known per se).

The target value Tv is then determined, and the movement means 20 is commanded in such a manner that the lawn mower 1 remains at the target distance Td, corresponding to the target value Tv, in its re-entry to the recharging base 80.

As stated, for each re-entry to the recharging base 80, that is, for each work cycle, a different target value Tv is calculated.

Merely by way of example, for a first work cycle, the target value Tv can be equal to 4,980 Volts, and it corresponds to about 20 cm; for a second work cycle, the target value can be equal to 4,975 Volts, and it corresponds to about 30 cm.

In order to follow the perimeter cable 2 in a sufficiently reliable manner, the command module 63*b*, in cooperation with the comparison module 63*a*, provides for sending appropriate command signals to the movement means 20.

It should be noted that re-entry to the recharging base 80 can also be performed outside the cutting area S. In fact, as stated previously, the lawn mower 1 is capable of determining whether it is located inside or outside the cutting area S; in one embodiment, the re-entry can thus be performed on the outside, at the target distance Td, of the perimeter cable 2. In this embodiment, the portion P shall be advantageously realized in such a manner as to protrude externally, and not inward, with respect to the cutting area S. The succession of information constituting the reference data Ref will also be appropriately defined in such a manner as to be consistent with this embodiment.

If, during re-entry to the recharging base 80, the lawn mower 1 encounters the perimeter cable 2 (that is, the detection element 41 happens to come very close to the same perimeter cable 2), a standard short reverse and turn maneuver is then carried out in a pre-established direction.

If, during re-entry to the recharging base 80, the recognition module 64 verifies the presence of a portion P, the notification signal NS is then generated. This entails the deactivation of the operative module 63 and that the auxiliary module 65 provides for bringing the lawn mower 1 back to a substantially zero distance from the perimeter cable 2 and for having the lawn mower 1 remain "straddling" the cable for the preset length L.

Note that the command unit 60, together with the related sub-modules, has been described separately, solely for the purpose of explaining the functional characteristics of the invention in the best possible manner. In practice, the command unit 60 can be realized with a single electronic device, such as a processor or a microprocessor, suitably programmed for performing the operations described and claimed. Advantageously, the monitoring circuit 71 can also be implemented by means of the cited processor or microprocessor.

The invention achieves important advantages.

Above all, the lawn mower employed in the apparatus in accordance with the invention is capable of re-entering to the recharging base in a rapid and reliable manner.

Another advantage of the invention consists in the minimizing of the effect of the tracks left by the lawn mower during re-entry to the recharging base.

Another advantage of the invention consists in the reduction of wear on the motors and in general, in the reduction of energy consumption for movement of the lawn mower.

In particular, the lawn mower employed in the invention can dedicate a greater share of the energy stored in the batteries thereof to the cutting of grass, reducing the energy dedicated to movement for re-entry to the base.

Another advantage of the invention can be noted in the fact that the complexity of the execution of the operation consisting of re-entry to the base is reduced, thereby protecting the lawn mower from wear, breakdown and malfunctioning.

The invention claimed is:
1. An apparatus for cutting grass comprising:
   a lawn mower equipped with: movement means for movement of said lawn mower at least inside a cutting area (S); one or more blades for cutting grass in said cutting area (S);
   a perimeter cable, delimiting said cutting area (S);
   a management device for generating an electrical signal (ES) and for propagating the latter in said cable; and
   a recharging base for said lawn mower positioned along said perimeter cable;
   wherein said lawn mower further comprises a control unit equipped with:
      sensor means for detecting said electrical signal (ES) and for detecting, while said lawn mower is in operation, a maximum value (Vmax) and a minimum value (Vmin) for an intensity of said electrical signal (ES) being detected;
      wherein said maximum value (Vmax) and minimum value (Vmin) relate to the intensity of the electrical signal (ES) detected by the sensor means;
      a memory for storing said maximum value (Vmax) and said minimum value (Vmin) for an intensity of detection of said electrical signal (ES), said maximum and minimum values (Vmax, Vmin) being respectively representative of a minimum distance (Dmin) and a maximum distance (Dmax) of said lawn mower from said perimeter cable;
      a calculation module configured to determine, for said intensity of detection, a target value (Tv) that is non-null and comprised between said maximum value (Vmax) and said minimum value (Vmin), said target value (Tv) being representative of a target distance (Td) of said lawn mower with respect to said perimeter cable, said target value (Tv) being substantially different from a preceding target value determined for said intensity of detection; and
      an operative module including a comparison module, wherein said operative module is configured for combining the information coming from the sensor means and from the calculation module;
      wherein said comparison module is configured to compare the target value (Tv), obtained by said calculation module, with the intensity of the electrical signal (ES) being detected by the sensor means;

wherein said operative module is configured for sending appropriate command signals to the movement means so that, during movement of the lawn mower, the intensity of the electrical signal (ES) detected by the sensor means is substantially equal to the target value (Tv), keeping said lawn mower at a distance, with respect to said perimeter cable, that is substantially equal to said target distance (Td) during movement of said lawn mower towards said recharging base.

2. The apparatus according to claim 1, wherein said calculation module is configured to determine said target value (Tv) randomly.

3. The apparatus according to claim 1, wherein said calculation module is configured to determine said target value (Tv) based on a predetermined sequence of values.

4. The apparatus according to claim 1, wherein said preceding target value is a target value utilized for a preceding re-entry of said lawn mower in said recharging base.

5. The apparatus according to claim 1, wherein said operative module comprises:
a comparison module configured to compare said target value (Tv) with the intensity with which said electrical signal (ES) is detected by said sensor means; and
a command module associated with said comparison module and configured to:
command said movement means in such a manner that said lawn mower turns in a certain direction in the case where said detected intensity is lower than said target value (Tv); and
command said movement means in such a manner that said lawn mower turns in a direction differing from said certain direction, for example rightward, in the case where said detected intensity is greater than said target value (Tv).

6. The apparatus according to claim 5, wherein said comparison module is configured to carry out said comparison repeatedly.

7. The apparatus according to claim 5, wherein the turns commanded by said command module have a radius of curvature greater than 0.70 meter and/or define angles of less than 90°.

8. The apparatus according to claim 1, wherein said lawn mower further comprises:
a power supply unit; and
a monitoring circuit for monitoring said power supply unit and generating an alert signal (AS) when the charge of said power supply unit drops below a preset threshold; and
said control unit being associated with said monitoring circuit so that said calculation module and said operative module can be activated as a function of said alert signal (AS).

9. The apparatus according to claim 1, wherein said perimeter cable has at least one portion (P) having a predetermined conformation, said control unit further comprising:
a recognition module configured to:
determine, based on said electrical signal (ES) being propagated in said portion (P), main data (MD) representative of the conformation of said portion (P) of the cable;
compare said main data (MD) with previously stored reference data (Ref) representative of a reference conformation; and
generate a notification signal (NS) in the case of correspondence between said main data (MD) and said reference data (Ref); and
an auxiliary module associated with said recognition module and configured to:
receive said notification signal (NS); and
command said movement means following said reception, in such a manner that said lawn mower moves so as to encounter said cable once again and then moves along said cable, at a substantially zero distance from said cable.

10. The apparatus according to claim 9, wherein said portion (P) has a conformation that is concave with respect to the perimeter defined by said cable.

11. The apparatus according to claim 6, wherein said comparison module is configured to carry out said comparisons at an interval within a range of 1 s to 3 s.

* * * * *